United States Patent [19]

Kubota

[11] Patent Number: 4,571,944
[45] Date of Patent: Feb. 25, 1986

[54] BLOW-OFF VALVE IN A QUICK TAKE-UP MASTER CYLINDER

[75] Inventor: Hitoshi Kubota, Fujisawa, Japan

[73] Assignee: Nissan Motor Company, Limited, Yokohama, Japan

[21] Appl. No.: 553,425

[22] Filed: Nov. 21, 1983

Related U.S. Application Data

[63] Continuation of Ser. No. 256,486, Apr. 22, 1981, abandoned.

[30] Foreign Application Priority Data

Apr. 25, 1980 [JP] Japan ................................ 55-55731

[51] Int. Cl.⁴ ............................................. B60T 11/20
[52] U.S. Cl. ........................................ 60/562; 60/578; 137/522
[58] Field of Search ................. 60/574, 578, 562, 588; 137/522

[56] References Cited

U.S. PATENT DOCUMENTS

| 2,166,742 | 7/1939 | Lambert | 60/578 |
| 2,742,054 | 4/1956 | Poundstone | 137/522 |
| 3,147,042 | 9/1964 | Stelzer | 60/574 |
| 4,086,770 | 5/1978 | Shaw | 60/588 |
| 4,208,881 | 6/1980 | Brademeyer | 60/588 |

FOREIGN PATENT DOCUMENTS

| 1440451 | 6/1976 | United Kingdom . |
| 2000235 | 1/1979 | United Kingdom ................. 60/574 |
| 1581722 | 12/1980 | United Kingdom . |

Primary Examiner—Abraham Hershkovitz
Attorney, Agent, or Firm—Schwartz, Jeffery, Schwaab, Mack, Blumenthal & Evans

[57] ABSTRACT

A blow-off valve in the quick take-up master cylinder comprises first and second valves therein. The first valve is responsive to the fluid pressure built up in a primary pressure chamber. The second valve includes a valve member urged towards a valve seat thereof. The force urging the valve member of the second valve is adjustable according to the position of the first valve.

2 Claims, 7 Drawing Figures

BLOW-OFF VALVE IN A QUICK TAKE-UP MASTER CYLINDER

This application is a continuation, of application Ser. No. 256,486, filed Apr. 22, 1981, now abandoned.

BACKGROUND OF THE INVENTION

The present invention relates generally to a brake system master cylinder in a hydraulic brake system for an automotive vehicle, and in particular to a quick take-up master cylinder for disc-brake system. More specifically, the invention relates to a blow-off valve assembly in a quick take-up master cylinder.

In automotive vehicle brake systems, disc-brake systems are becoming widely used, since they do not tend to over-heat and cause vapour lock in the brake hydraulic circuit. In order to prevent the brake hydraulic circuit from over-heating and from generating noise, it is necessary to provide a sufficient space between the brake pad and a brake disc mounted and secured on the wheel axle for rotation therewith. In such brake systems, a quick take-up master cylinder is generally utilized to improve the response characteristics of the braking operation.

A typical construction of a quick take-up master cylinder is disclosed in the U.S. Pat. No. 4,133,178, issued on Jan. 9, 1979 to Frank W. Brooks, Sr. In this reference, a quick take-up master cylinder is disclosed which has a low pressure, high volume displacement, quick take-up chamber, and a high pressure, low volume displacement pressurizing chamber formed by a stepped bore and a stepped piston. A compensation control and blow-off valve unit is disclosed having a peripheral lip seal type valve providing compensation flow on brake release but preventing flow from the quick take-up chamber when the brakes are applied. A normally closed check valve is held open while the master cylinder is in the fully released position to provide communication between both pressurizing chambers and the fluid reservoir. As the pressurizing cup for the high pressure chamber closes its compensation port, the check valve is permitted to close by a camming action between a valve pin and a camming surface on the piston. Initial flow is obtained from the quick take-up chamber past the pressurizing cup into the high pressure chamber. At a predetermined pressure level, arranged to be sufficient to take up lining clearance and initially apply the vehicle brakes, the pressure in the quick take-up chamber opens the normally closed check valve so that fluid from the quick take-up chamber then flows to the reservoir without further pressure buildup in that chamber. As the master cylinder is released, compensation fluid can flow past the peripheral compensation valve to both chambers. When the master cylinder is returned to the fully released position, the check valve is forced open by action of the piston cam surface and the valve pin to provide fluid communication between the reservoir and both pressurizing chambers. A fluid flow restrictive orifice is provided in series with the normally closed check valve to prevent the high rate of pressure increase in the quick take-up chamber from being bypassed fully to the fluid reservoir upon a high rate of master cylinder actuation, forcing at least some of the pressure to pass by the cup seal into the high pressure chamber and the brake apply circuit.

FIGS. 1 illustrates the relationship between input force applied to the brake pedal and an output force applied to the wheel cylinders and FIG. 2 illustrates the relatioinship between the stroke of the primary and secondary pistons and fluid amount supplied to each of the wheel cylinders. As apparent from FIGS. 1 and 2, at the initial stage of application of the brake force, the amount of fluid supplied to the wheel cylinder rapidly increases while the brake pressure applied thereto moderately increases. Specifically, by rapidly reducing the volume of the primary fluid chamber, the amount of fluid to be supplied to rear wheel cylinder is rapidly increased. In spite of increasing the amount of fluid supplied to the rear wheel cylinder, the pressure of the fluid is not so rapidly as a result of communication between the primary pressure chamber and the fluid reservoir via a compensation passage. The brake positions are represented by lines a and b in FIGS. 1 and 2 respectively. When the primary piston blocks communication between the primary pressure chamber and the fluid reservoir, the fluid pressure in the primary pressure chamber increases rapidly as represented by line c in FIG. 1. Corresponding to the increasing of the fluid pressure in the primary pressure chamber, the secondary piston is moved to rapidly increase the fluid pressure therein. Therefore, as seen from FIG. 1, a loss stroke of brake operation indicated at L remains even for quick take-up master cylinders.

SUMMARY OF THE INVENTION

Therefore, it is an object of the present invention is to provide a tandem master cylinder capable of minimizing loss stroke upon application of the brake.

Another and more specific object of the invention is to provide a blow-off valve for a quick take-up master cylinder which is capable of regulating of fluid pressure applied to the wheel cylinders and reducing the loss stroke of brake application to zero.

For accomplishing the above mentioned and other objects, there is provided a blow-off valve in a quick take-up master cylinder comprising first and second valve devices therein. The first valve device is responsive to the fluid pressure built up in a primary pressure chamber. The second valve device includes a valve member resiliently urged to a valve seat thereof. The spring force urging the valve member of the second valve device is adjustable according to the position of the first valve device.

According to one embodiment of the present invention, there is provided a blow-off valve assembly in a quick take-up master cylinder comprising a cylinder housing having a stepped bore axially extending along the longitudinal axis of the cylinder housing. Primary and secondary pistons are disposed within the cylinder housing bore in tandem relationship and cooperative with each other and with a brake pedal, the primary and secondary pistons define primary and secondary pressure chambers within the cylinder housing bore respectively communicating with rear and front wheel cylinders. A fluid reservoir is connected with the cylinder housing for supplying a working fluid to the rear and front wheel cylinders via the primary and secondary pressure respectively, a blow-off valve assembly is provided which includes a movement, movable in response to the fluid pressure in the primary pressure chamber. A control valve member whose set point corresponds to the position of the movement. The movement defines a set pressure which is applied to the control valve member, the set pressure corresponding to the position of the movement whereby the control valve alternates its valve position between a first position blocking communication between the fluid reservoir and the primary pressure chamber and a second position establishing communication therebetween.

According to another embodiment of the present invention, a blow-off valve assembly for a master cylinder is provided comprising a first valve device having a pressure accumulating chamber therein, the movement includes a movable bias spring seat member and a stationary seat opposing the movable member, the movable member is normally urged toward the valve seat. A first fluid passage is formed in the cylinder housing and communicates between a primary pressure chamber and a pressure accumulating chamber, a control valve which cooperates with the movement and includes a valve member for closing a second fluid passage and a valve seat on which the valve member of the control valve is normally seated with a set pressure provided by a set spring, the set spring bias being variable, in responsive to the motion of the movable member of movement.

BRIEF DESCRIPTION OF THE DRAWINGS

The present invention will become more fully understood from the detailed description given hereinbelow and from the accompanying drawings of the preferred embodiment of the present invention, which however, should not be taken as limitative to the present invention but for elucidation and explanation only.

In the drawings.

DESCRIPTION OF THE PREFERRED EMBODIMENT

Figure 1:
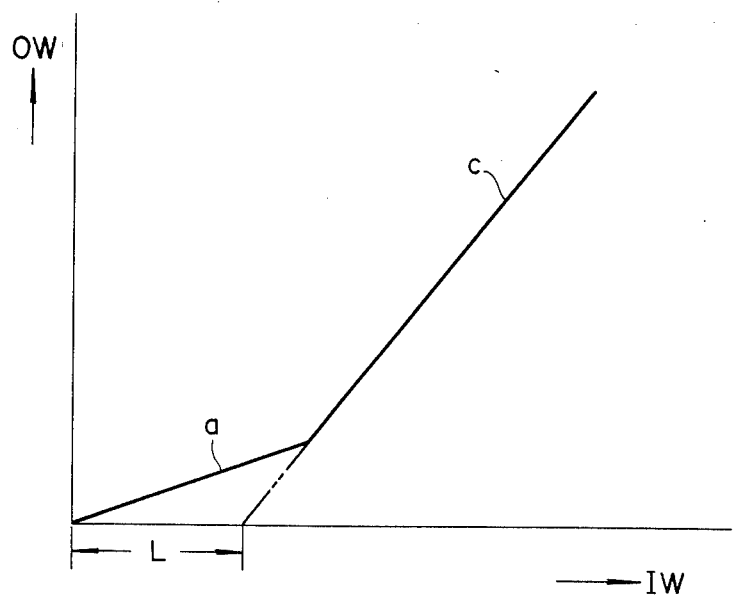
FIG. 1 shows the relationship between input force and output force in the conventional quick take-up master cylinder.
Figure 2:
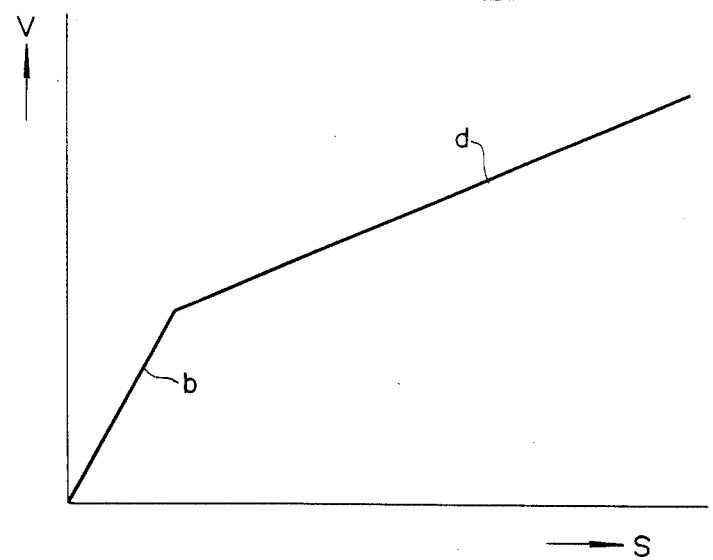
FIG. 2 shows the varying of fluid amount supplied to the wheel cylinder with respect to the piston stroke of the master cylinder.
Figure 3:
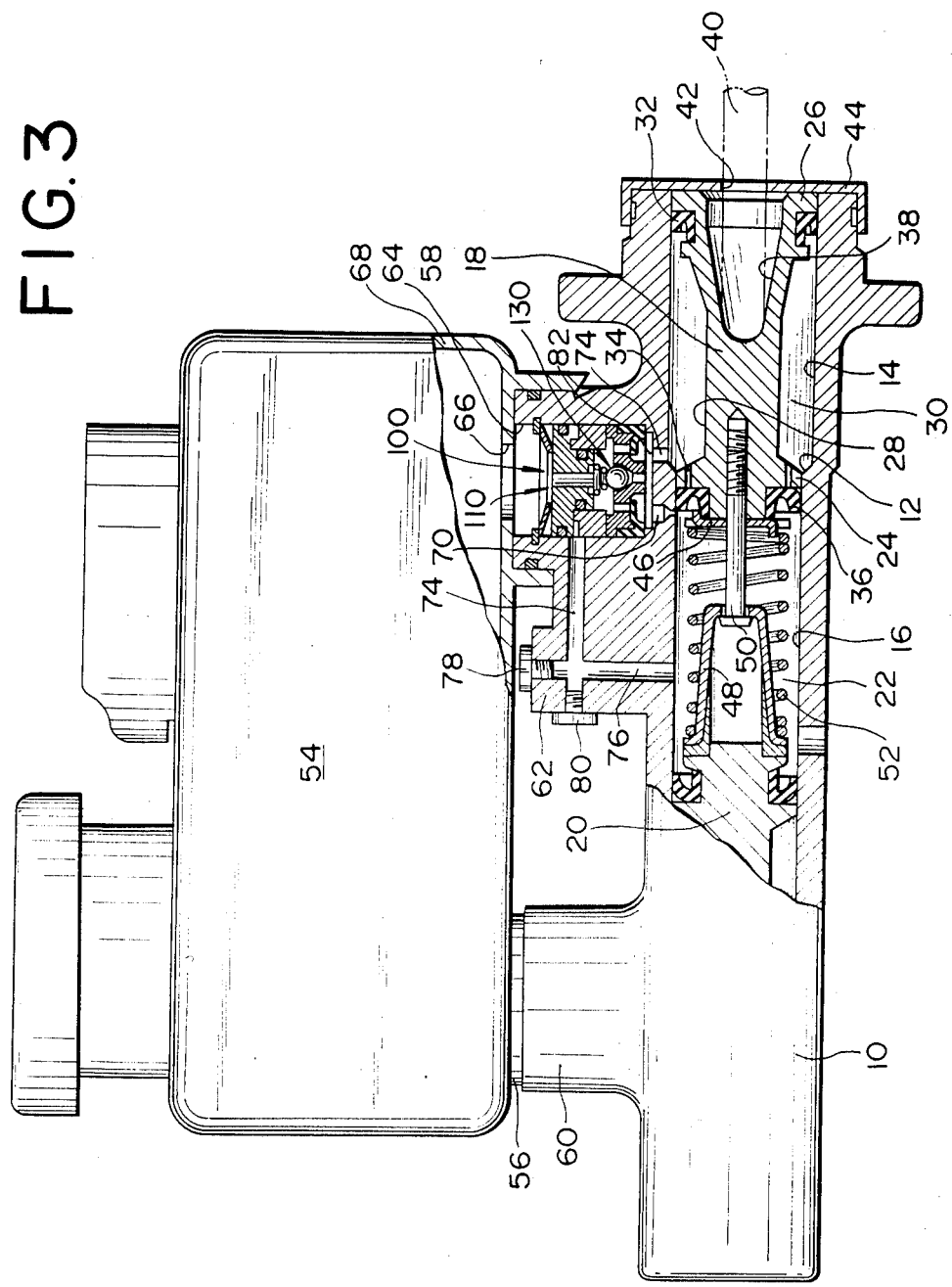
FIG. 3 is a partially sectioned side elevation of a preferred embodiment of a quick take-up master cylinder according to the present invention.

Referring now to FIG. 3, there is illustrated a preferred embodiment of a quick take-up master cylinder according to the present invention. The master cylinder has a cylinder housing 10 with a longitudinary extending bore 12. The bore 12 comprises a large diameter section 14 and a relatively smaller diameter section 16. The large diameter section 14 of the bore 12 is located adjacent an open end of the bore. Primary and secondary pistons 18 and 20 are disposed within the bore 12 in a tandem fashion. A primary pressure chamber 22 is defined between the primary and secondary pistons 18 and 20. Though it is not clearly shown, the secondary piston 20 defines a secondary pressure chamber between its end remote from the primary pressure chamber and the leftmost end of the bore 12 as viewed in FIG. 3.

The primary piston 18 has flange sections 24 and 26 adjacent either end. Between the flange sections 24 and 26, an annular recess 28 is defined which functions as a quick take-up of primary fluid chamber 30. The flange section 26 is located in the larger diameter section 14 of the bore 12 and thus adapted the external diameter thereof corresponds to the internal diameter of the larger diameter section. The flange section 24 has an external diameter corresponding to an internal diameter of the smaller diameter section 16 and is located within the smaller diameter section. An annular sealing ring 32 is provided on the outer periphery of the flange section 26 to provide a fluid tight seal. A plurality of fluid passages 34 are formed in the flange section 24 for communication between the quick take-up chamber 30 and the primary pressure chamber 22. The ends of the fluid passages 34 opening toward the primary pressure chamber 22 are closed by an annular sealing cup 36.

A longitudinally extending bore 38 is formed in the primary piston 18. The bore 38 extends from the end of the piston 18 which is adjacent the flange section 26. An input rod 40, mechanically connected to a brake pedal and inserted into the bore 12 through an opening 42 formed in a fitting 44, engages the bore 38. A spring seat 46 of a generally disc-shaped configuration is disposed within the primary pressure chamber 22 and mounted on the end of the primary piston 18. The spring seat 46 opposes another spring seat 48 of generally cup-shaped configuration which is mounted on an end of the secondary piston 20. The spring seat 48 is connected with the primary piston 18 by a screw 50 to maintain the spacing between the secondary piston 20 and the primary piston 18. Between both spring seats 46 and 48, a compession spring 52 is disposed for providing a return pressure to the primary piston 18.

A fluid reservoir 54 has mounting tubes 56 and 58 for engagement with the cylinder housing 10. Opposing the mounting tubes 56 and 58, the cylinder housing 10 is provided with projecting portions 60 and 62. The projecting portion 62 is formed with a vertical bore 64 opening toward the fluid reservoir 54 for receiving a working fluid in the fluid reservoir through an opening 66 formed in reservoir housing 68. The vertical bore 64 communicates with the bore 12 of the cylinder housing 10 via compensation passages 70 and 72. Also, the vertical bore 64 communicates with the primary pressure chamber 22 through lateral and vertical openings 74 and 76 respectively formed within the projecting portion 62. Each of open ends of the openings 74 and 76 is sealingly closed with closure screws 78 and 80 respectively.

The vertical bore 64 has a smaller diameter section 82 adjacent the bottom thereof. The compensation passage 70 and 72 respectively open to the smaller diameter section 82. The compensation passage 70 opens to the smaller diameter section 16 of the bore 12 and the compensation passage 72 opens to the larger diameter section 14.

Figure 4:
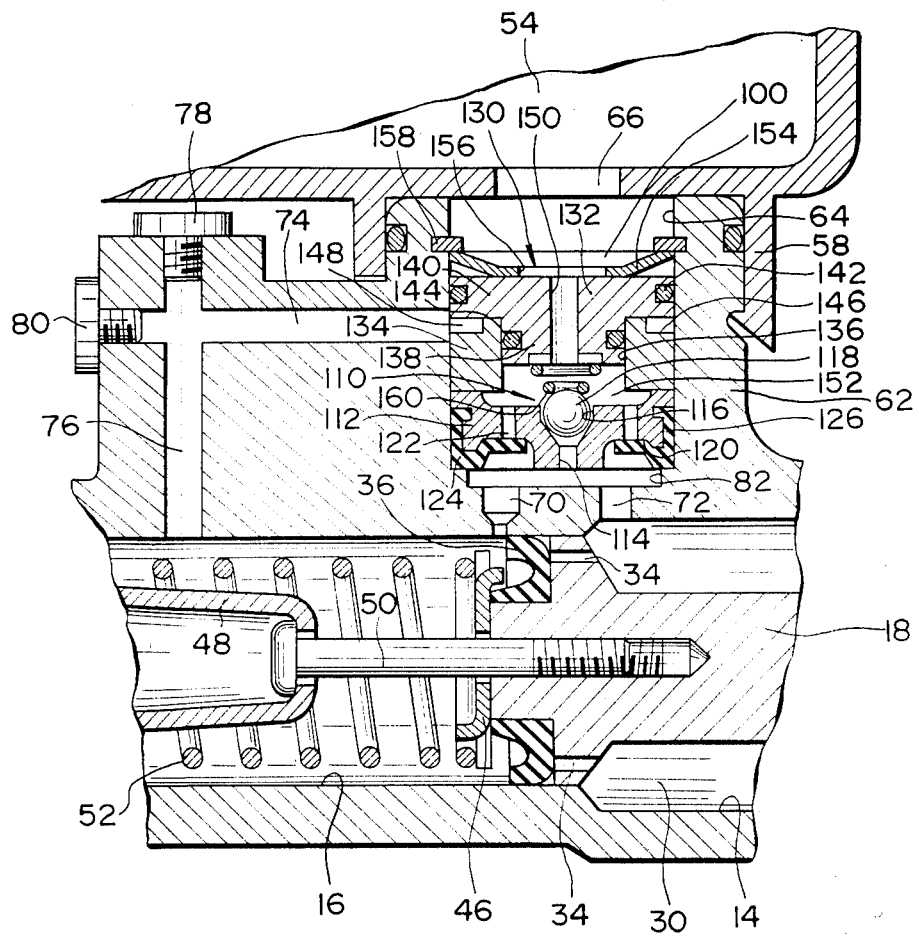
FIG. 4 is an enlarged section of a blow-off valve assembly in the quick take-up master cylinder of FIG. 3, showing a valve position where the brake pedal is not depressed or the hydraulic pressure build up is lower than a preset pressure.

Turning to FIG. 4, in the major portion of the vertical bore 64, a pressure control valve assembly 100 is provided for relieving fluid pressure in the primary fluid chamber 30 when the brake pressure in the primary fluid chamber 30 and, in turn, in the primary pressure chamber 22 exceeds a predetermined value. As will become apparent from FIGS. 4–7 and from the description below, when the fluid pressure in the quick take up or primary fluid chamber 30 exceeds a first predetermined pressure, the pressure control valve assembly 100 establishes fluid communication between the primary fluid chamber 30 and the fluid reservoir 54 against the bias of the first set pressure. When the fluid pressure in the primary pressure chamber 22 exceeds a second predetermined pressure which is larger than the first predetermined pressure, the pressure control valve assembly 100 varies the set pressure for establishing the fluid communication between the primary fluid chamber 30 and the fluid reservoir 54 against a second set pressure which is smaller than the first set pressure. The pressure control valve assembly 100 generally comprises a ball valve means 110 and a thrusting means or movement 130. The ball valve means 110 includes a ball valve seat 112 formed, at the central portion thereof, with a vertically extending through opening 114 for communicating between the fluid reservoir 54 and the primary fluid chamber 30. The opening 114 has a bowl-shaped upper section 116 in which is seated a ball valve member 118. The ball valve seat 112 is formed with an annular recess 120 on the lower horizontal plane thereof. A plurality of vertical fluid passages 122 open to the recess 120 at the lower end thereof. In the recess, an elastic sealing member 124 is disposed for closing the lower ends of the vertical fluid passages 122. The sealing member 124 has a vertical section 126 which is sandwiched between the internal periphery of the vertical bore 64 and the outer periphery of the ball valve seat 112 for providing a fluid-tight seal.

The thrusting valve 130 comprises a movable member 132 disposed within the vertical bore 64 and a seat 134 secured to the internal periphery of the vertical bore 64 and opposing to movable member 132. The seat 134 has a generally annular configuration and defines a central, through opening 136. The movable member 132 has a lower section 138 adapted be received in the opening 136. On the outer peripheries of the upper and lower sections 140 and 138 of the movable member 132, there are provided sealing rings 142 and 144 respectively for providing a liquid seal between the internal peripheries of the vertical bore 64 and the through opening 136. The seat 134 is formed with an annular cut-out 146 on its upper plane adjacent the outer periphery thereof to define an annular chamber 148 which communicates with the lateral opening 74. The movable member 132 is formed with a vertical fluid passage 150 extending along the center axis thereof for communication between the fluid reservoir 54 and a chamber 152 defined between the movable member 132 and the ball valve seat 112.

The movable member 132 is normally urged toward the seat 134 by a disc-shaped spring 154 with a central opening 156. The outer periphery of the spring 154 engages an annular stopper 158 secured on the internal periphery of the vertical bore 64. The movable member 132 is formed with a recess laterally extending from the lower end of the vertical fluid passage 150 on the lower plane thereof. In the recess, the upper end of a helical spring 160 is seated. The lower end of the helical spring 160 abuts against the ball valve member 118 for normally forcing the ball valve toward the bowl shaped upper section 116 of the opening 114 for blocking fluid flow from the primary fluid chamber 30 to the fluid reservoir 54.

Figure 5:
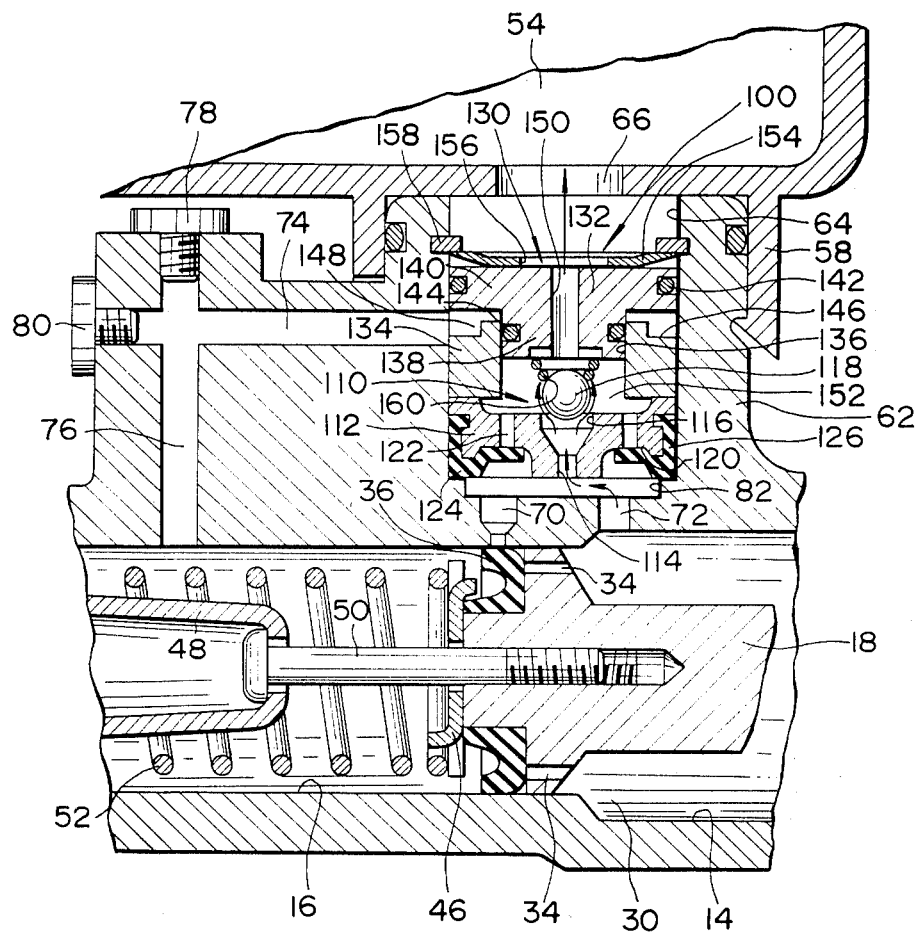
FIG. 5 is a similar view to FIG. 4, showing a valve position where the hydraulic pressure buildup is higher than a preset pressure.

In operation, responsive to application of the brake force to the brake pedal, the primary and secondary pistons 18 and 20 are respectively moved toward the primary and secondary pressure chambers. During the travel of the piston stroke, the primary piston 18 penetrates the smaller diameter section 16 thereby reducing the volume of the quick take up or primary fluid chamber 30. As a result, the fluid in the primary fluid chamber 30 is rapidly pressurized and forced into the primary pressure chamber 22 through a space formed by deformation of the sealing cup 36. As the fluid pressure in the primary pressure chamber 22 increases, the secondary piston 20 moves towards the secondary pressure chamber (not illustrated) to establish the fluid pressure therein corresponding to the fluid pressure in the primary pressure chamber 22. If the fluid pressure in the primary fluid chamber 30 exceeds a set pressure of the ball valve assembly 110, the ball valve member 118 will move upwardly as shown in FIG. 5 establish fluid communication between the primary fluid chamber 30 to the fluid reservoir 54. At the same time, the pressurized fluid in the primary pressure chamber 22 flows through the vertical and lateral openings 76 and 74 into the annular chamber 148. Thus, the fluid pressure in the annular chamber 148 corresponds to that in the primary pressure chamber 22. As the fluid pressure in the primary pressure chamber 22 is increased, the fluid force applied to the movable member 140 becomes greater than the set pressure on the movable member 140 from disc-shaped spring 154. The member 140 therefor unseats from seat 134 thereby reducing the spring pressure applied to the ball valve member 118 and permitting the ball valve member 118 to unseat. Therefore, the pressurized fluid in the primary fluid chamber 30 flows through the compensation passages 70 and 72, the opening 114, the vertical passage 150 to the fluid reservoir 54.

In the embodiment shown, the spring pressure of the helical spring 160 is greater than that of the discshaped spring 154. Therefore, by upward motion of the movable member 140, the ball valve member 118 is released from the bowl-shaped upper section 116 of the opening 114 to permit fluid flow therethrough when the fluid pressure in the primary fluid chamber 30 exceeds the spring pressure of the helical spring 160. By permitting pressurized fluid in the primary fluid chamber 30 to flow to the fluid reservoir, the fluid pressure in the primary fluid chamber 30 is reduced until the ball valve member 118 moves downwardly under the influence of spring 160 to again become seated onto the bowl-shaped upper section 116. Thus, the position of the ball valve member 118 alternates between an unseated and a seated position thereby modulating fluid pressure in the primary fluid chamber 30 and, in turn, in the primary pressure chamber 22.

Figure 6:
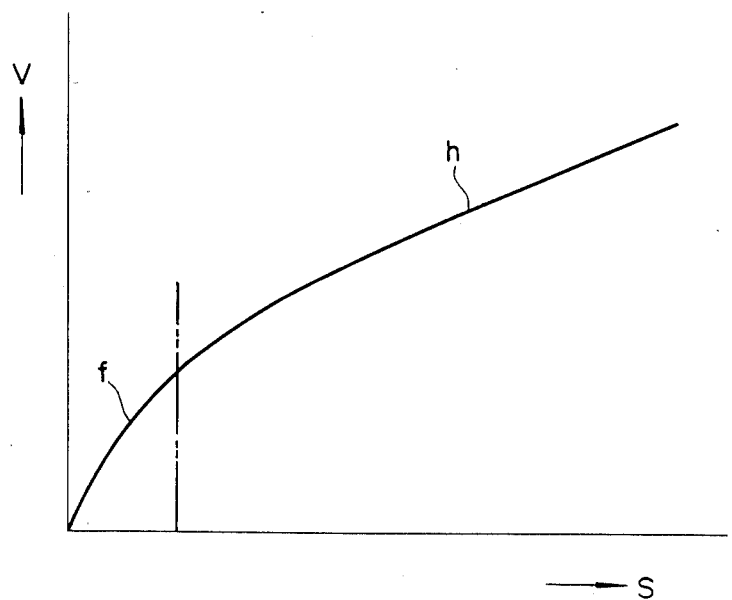
FIG. 6 corresponds to FIG. 2 and illustrates the relationship between the amount of fluid amount supplied and the piston stroke of the master cylinder with the present invention.
Figure 7:
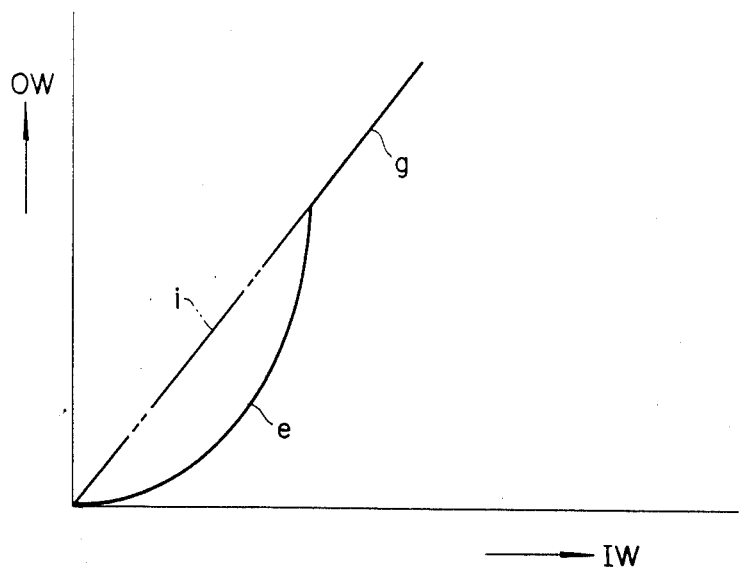
FIG. 7 corresponds to FIG. 1 and illustrates the relationship between the input force and the output force of the preferred embodiment of the master cylinder of FIG. 3.

During the loss stroke of the brake operation, as hereabove mentioned the fluid pressure applied to the wheel cylinders is gradually and moderately increased as represented by line e in FIG. 7. After a loss stroke function, brake pressure in the wheel increases in a generally is linear fashion as represented by line g in FIG. 7. The extension i of the line g crosses the fundamental point P in the shown embodiment. This means the loss stroke upon application of the brake can be disregarded and the brake will be effective immediately after finishing loss stroke. During braking, the amount of fluid supplied to the wheel cylinders increases as shown in FIG. 6. Namely, during the loss stroke, the amount of fluid supplied to the wheel cylinder increases rapidly as represented by the line f and thereafter increases in a generally linear fashion as represented by line h.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A quick take-up master cylinder for an automotive brake system having a primary and a secondary piston disposed in a bore in said cylinder and respectively defining therein independent primary and secondary pressure chambers for establishing a braking fluid pressure;
    a variable volume take-up chamber for establishing a first fluid pressure therein as said primary piston moves towards said primary pressure chamber, said first fluid pressure being selectively supplied only to said primary pressure chamber to increase the braking fluid pressure therein, and being operable to at least partially establish said braking fluid pressure;
    a pressure control valve means, for relieving said first fluid pressure whenever said first fluid pressure exceeds a set pressure, comprising:
    a fluid passage connecting said quick take-up chamber to a fluid reservoir;
    a pressure control valve disposed in said fluid passage, said pressure control valve being movable between a first position in which fluid communication between said quick take-up chamber and said fluid reservoir is blocked and a second position in which said fluid communication is established;
    a bias spring for providing a biasing force to urge said pressure control valve towards said first position;
    a set pressure adjusting means for adjusting said biasing force, said adjusting means including a movement against which said bias spring seats, said movement, in a first position thereof, being operable to maintain the biasing force at a first magnitude, said movement being movable to a shifted position wherein said biasing force is reduced;
    a retainer means for resiliently biasing said movement toward said first position;
    first hydraulic means for moving said pressure control valve to said second position when said first fluid pressure exceeds the biasing force of said bias spring; and
    second hydraulic means for moving said movement to said shifted position whenever the fluid pressure in said primary pressure chamber exceeds the bias of said retainer means.

2. The master cylinder of claim 1, wherein said retainer means comprises a leaf spring resiliently biasing said movement towards said first position.

* * * * *